Sept. 2, 1969 E. POUMAKIS ET AL 3,465,128

READOUT SYSTEM IN INCREMENTAL TAPE TRANSPORT

Filed Sept. 21, 1964 2 Sheets-Sheet 1

INVENTORS
ANDREW GABOR
ELEUTHERE POUMAKIS
BY
Douglas M. Clarkson
ATTORNEY

INVENTORS
ANDREW GABOR
ELEUTHERE POUMAKIS
BY Douglas M. Clarkson
ATTORNEY

United States Patent Office 3,465,128 Patented Sept. 2, 1969

3,465,128

READOUT SYSTEM IN INCREMENTAL TAPE TRANSPORT

Eleuthere Poumakis, East Islip, and Andrew Gabor, Huntington, N.Y., assignors to Potter Instrument Company, Inc., Plainview, N.Y., a corporation of New York Filed Sept. 21, 1964, Ser. No. 397,934
Int. Cl. G06k *7/00;* G08b *29/00;* G11b *5/00*
U.S. Cl. 235—61.11 9 Claims

ABSTRACT OF THE DISCLOSURE

The specification and drawings disclose a circuit for an incremental tape transport that prevents a false output signal when the transducer head stops in a position that partially overlaps the region where the character just read was recorded.

This invention, generally, relates to incremental tape transports and, more particularly, to a system for preventing error signals in the read amplifier output of an incremental tape transport.

In contrast with conventional tape transports, which read out and record information while the tape runs continuously at a high speed, incremnetal tape transports read out and record one character at a time, and the tape is stopped between characters. Because incremental tape transports start and stop between characters, they operate at much lower transfer rates than conventional tape transports, but they have an important advantage over conventional tape transports in that each character can be recorded on the tape or read out from the tape at any random selected time.

In a conventional tape transport the transfer of characters to or from the tape must be in synchronism with the tape movement. For this reason incremental tape transports are referred to as "asynchronous," whereas conventional tape transports are referred to as "synchronous." Because incemental tape transports are asynchronous, the need for costly buffering is eliminated, the information processed does not have to be divided into blocks of limited length corresponding to the capacity of the buffer, and uninterrupted communication is permitted.

Uninterrupted communication can be obtained in a conventional tape transport only with an elaborate reflexing buffer.

When information is being read out of an incremental tape transport, it is possible for the tape to stop so that one or more of the transducing heads overlap the recorded signals representing the previous character. As a result, when the tape is started up again to read out the signals representing the next character, the transducing heads may produce spurious output signals, which can be erroneously interpreted as true character information.

The present invention comprises a system for preventing this kind of error from occurring.

Accordingly, an object of the present invention is to provide an improved read out system in an incremental tape transport.

Another object of the present invention is to prevent spurious pulses read out in an incremental tape transport from being erroneously interpreted as character information.

A further object of the present invention is to provide an incremental tape transport in which there has been eliminated the effect of spurious pulses which are read out by the transducing heads as a result of the stopping of the transducing heads in a position partially overlapping the zone where a preceding character has been recorded.

In accordance with the present invention, binary "ones" are recorded by the magnetic flux being switched to the opposite polarity, and binary "zeros" are recorded by there being no change in the flux. This type of recording is referred to as non-return-to-zero recording or NRZ recording. When such an NRZ recording is read out, binary ones will be represented by alternate positive and negative pulses, whereas binary zeros will be represented by the absence of pulses. The characteristic of successive ones, being represented by pulses of alternate polarities, is used to prevent spurious pulses from being misinterpreted.

When a transducing head stops in a position so that it partially overlaps the zone of a preceding character where the polarity of the flux has been reversed to record a one, the resulting spurious pulse that is produced in the next incremental step will be of the same polarity as the pulse that was read out from this transducing head during the preceding step. The system of the present invention is designed so that it will accept pulses as representing ones only if they alternate in polarity. Accordingly, the spurious pulses will not be accepted.

This result is accomplished by applying the signals produced by the transducing head to two channels and half-wave rectifying each of the channels to pass opposite polarity pulses. A flipflop is provided to "enable" gates in each channel and to alternately switch between channels each time a pulse representing a "one" is read out. In this manner, the spurious pulses are prevented from being erroneously interpreted as character information.

Further objects and advantages of the present invention will become readily apparent as the following detailed description unfolds and when taken in conjunction with the drawings wherein.

Figure 1:
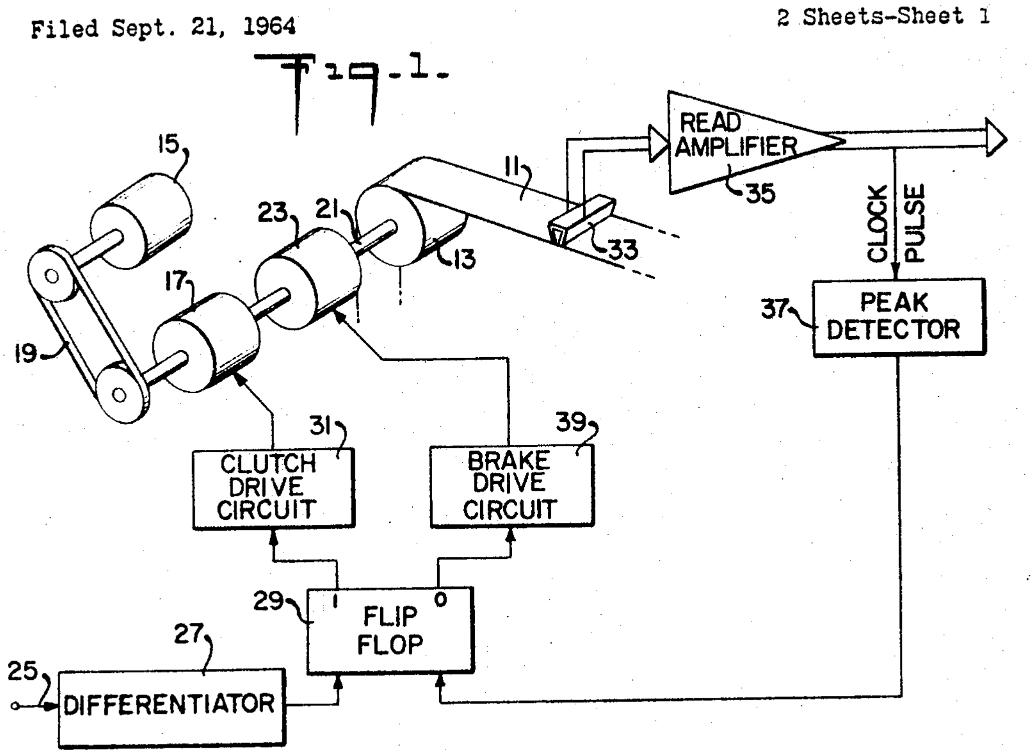
FIG. 1 is a schematic diagram to illustrate the system for driving the tape in an incremental tape transport.

As shown in FIG. 1, the magnetic storage tape, which is designated by the reference number 11, is driven by a capstan 13. A motor 15 drives the input of a coaxial clutch 17 by means of a belt and pulley mechanism 19. When the clutch 17 is energized, it couples its input to a shaft 21, which drives the capstan 13.

In operation, the motor 15 will be energized continuously to drive the input of the clutch 17 at a constant speed so that when the clutch 17 is energized, the motor 15 will drive the capstan 13. Also surrounding the shaft 21 is a coaxial brake 23, which, when energized, will bring the shaft 21 and the capstan 13 to a stop.

When the tape 11 is between incremental steps, the brake 23 will be energized and the clutch 17 will be deenergized. To advance the tape one incremental step, the clutch 17 is energized and the brake 23 is deenergized in response to a start signal, so that the motor 15 begins to drive the capstan 13 and the tape 11. Then automatically, in response to a stop pulse, the clutch 17 is deenergized and the brake 23 is energized to decelerate the capstan and the tape to a stop.

In this manner, the tape 11 is advanced through one incremental step. The system will then be ready to advance the tape 11 another incremental step in response to the next applied start signal. In the preferred embodiment the tape is advanced through a distance of 0.005 inch on each incremental step.

The start signals, in response to which the tape is advanced, are in the form of pulses applied to an input 25. Each pulse applied to the input 25 is differentiated by a differentiator circuit 27 and then applied to a flipflop circuit 29 to set the circuit 29 in its "one" state. When the tape 11 is at rest between incremental steps, the circuit 29 will be in its "zero" state.

When the flipflop circuit 29 is set in its one state in response to the start pulse applied at input 25, it will apply an enabling signal to a clutch drive circuit 31, which in response to the enabling signal will energize the clutch 17. In this manner, the clutch 17 is energized in response to a start pulse applied at input 25.

The tape is advanced past a set of reproducing heads 33, which read out signals representing one character each time the tape is advanced one step. These signals are then amplified by a set of read amplifiers 35. One of the signals with each set of signals representing a character will be a clock pulse, which after being amplified by the read amplifiers 35 is applied to a peak detector 37. The peak detector 37 detects the time of the peak of the applied clock pulse and at the time of the peak of the applied clock pulse applies a pulse to the flipflop 29 to set the flipflop 29 back to its zero state. When the flipflop 29 is set back to its zero state, it will no longer apply an enabling signal to the clutch drive circuit 31, which accordingly will deenergize the clutch 17. When the flipflop 29 has been switched to its zero state, it will apply an enabling signal to a brake drive circuit 39, which in response to receiving this enabling signal will energize the brake 23. Thus, when the flipflop 29 is set back to its zero state in response to the pulse from the peak detector 37, the clutch 17 will be deenergized and the brake 23 will be energized to brake the shaft 21 and capstan 13 to a stop. In this manner, the tape is automatically stopped after one character has been read out by the transducing heads 33.

When it is desired to read out another character, the tape is advanced in the same manner through one incremental step in response to a start pulse applied to the input 25.

The signals recorded on the tape 11 representing characters are binary NRZ signals, which represent a binary one by reversal of flux polarity and represent a binary zero by no change in flux. Accordingly, when the signals are read out, ones will be represented by pulses alternating in polarity whereas the zeros will be represented by the absence of pulses at the times of occurrence of the clock pulses.

When the tape is stopped between incremental steps, one or more of the transducing heads may partially overlap a zone of flux reversal, which has been recorded to represent a one in the preceding increment. When this overlapping occurs, the transducing head will produce a spurious output pulse when the tape starts moving on the next incremental step.

Figure 2:
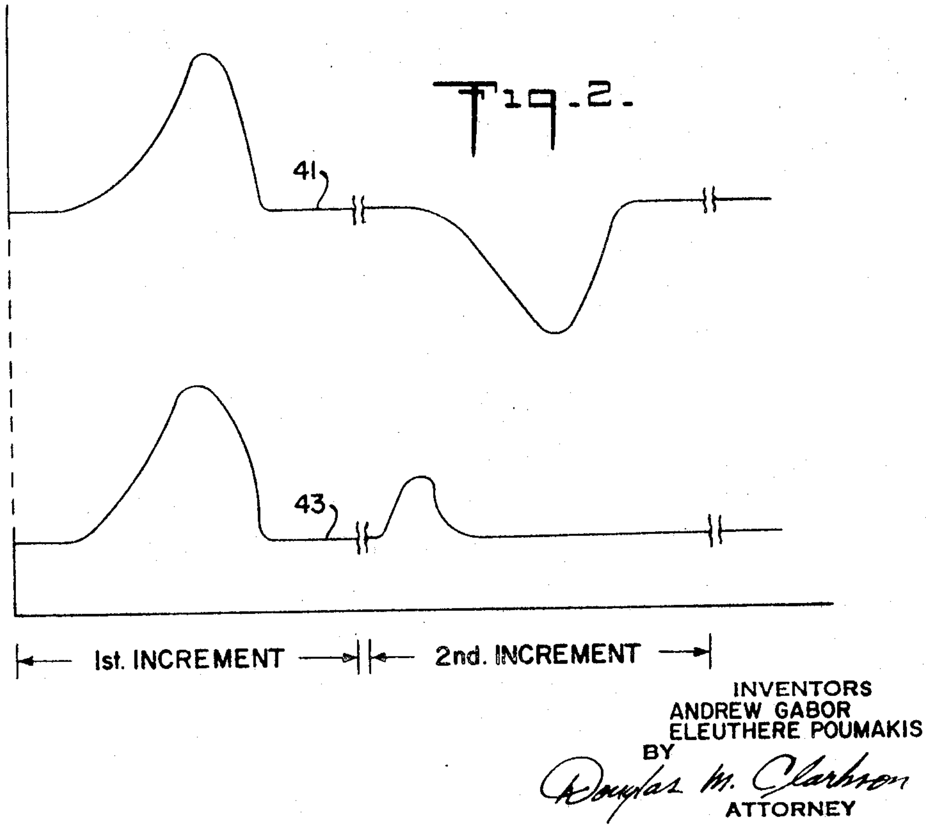
FIG. 2 shows some typical wave forms produced by a transducer head in an incremental tape transport.

This phenomenon is illustrated by the curves in FIG. 2, in which the curve 41 illustrates the output voltage from a transducing head when two binary ones have been recorded in successive increments and are read out and the curve 43 illustrates the output voltage that is produced by a transducing head when a binary one followed by a binary zero is read out and the transducing head stops between the two increments partially overlapping the flux transition zone of the first increment.

As illustrated by the curve 41, two successive binary ones are represented in the read out signal by two pulses of opposite polarities. The curve 43 shows a small pulse produced in the second increment having the same polarity as the pulse produced in the first increment. The small pulse produced in the second increment of curve 43 is spurious, and the system of the present invention serves to prevent such a pulse from being interpreted as representing a binary one.

Figure 3:
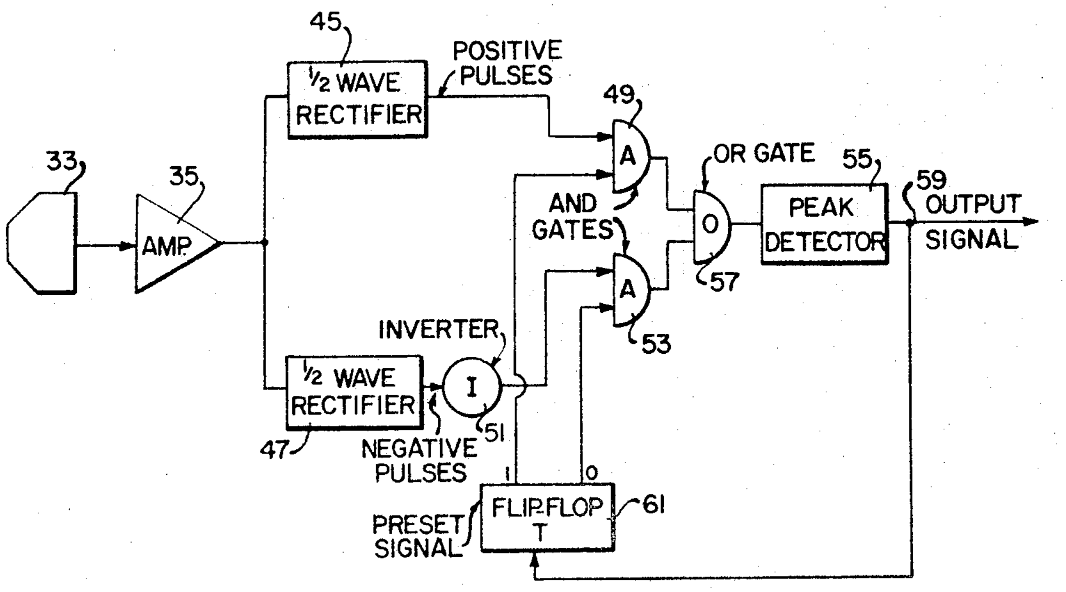
FIG. 3 illustrates the read out system of the present invention for eliminating the spurious pulses in the incremental tape transpoit.

FIG. 3 illustrates the system of the present invention connected to the output of one of the transducing heads 33. An identical system is connected to the output of each of the other transducing heads 33.

As shown in FIG. 3, the output pulses produced by the transducing head 33 are amplified by one of the read amplifiers 35 and then applied to a half wave rectifier 45 in one channel and a half wave rectifier 47 in another channel. The half wave rectifier 45 is poled to pass only positive pulses and the half wave rectifier 47 is poled to pass only negative pulses. The positive pulses produced at the output of the rectifier 45 are applied to a gate 49 and the negative pulses produced at the output of the half wave rectifier 47 are inverted by an inverter 51 and then applied to gate 53. After being inverted by the inverter 51, the pulses passing through the half wave rectifier 47 will be positive so that the pulses applied to both gates 49 and 53 have the same polarity.

When the gate 49 is enabled, it will pass the pulses from the half wave rectifier 45 to a peak detector 55 through an OR gate 57. When the AND gate 53 is enabled, it will pass the positive pulses from the inverter 51 through the OR gate 57 to the peak detector 55. Each time the peak detector 55 receives a pulse from the OR gate 57, it produces an output pulse at the time of the peak of the applied pulse.

The output pulses of the peak detector 55 are applied to an output 59 and are also applied to a flipflop 61, which controls the gates 49 and 53. When the flipflop 61 is in its one state, it will enable the gate 49, and when the flipflop 61 is in its zero state, it will enable the gate 53. Each pulse applied to the flipflop 61 by the peak detector 55 will switch the flipflop to its opposite state.

As pointed out above, as successive binary ones are read out by the transducing head 33, they will alternate in polarity. The positive pulses will pass through the half wave rectifier 45, and the negative pulses will pass through the half wave rectifier 47 and be inverted by the inverter 51. Thus, the positive pulses will be applied to the gate 49 and the negative pulses, after being inverted, will be applied to the gate 53.

When a positive pulse representing a one is applied to the gate 49, the flipflop 61 will be in its one state so that the gate 49 will be enabled. As a result, the pulse representing the one will pass through the gate 49 and then through the OR gate 57 to the peak detector 55. The peak detector 55, as a result, will set the flipflop 61 in its zero state.

Accordingly, when the next pulse representing a one is produced, the flipflop 61 will be in its zero state and the gate 53 will be enabled. Thus this next pulse, which will be negative, after being inverted by the inverter 51, will pass through the gate 53 and then through the OR gate 57 to the peak detector 55.

Accordingly, the peak detector 55 will apply a pulse to the flipflop 61 to set the flipflop 61 back to its one state so that the gate 49 will be enabled at the time that the next pulse representing a one is read out by the transducing head 33. In this manner, the alternately positive and negative pulses pass through the gates 49 and 53 to the peak detector 55, which applies a pulse to the output 59 each time a pulse is applied to its input.

Accordingly, pulses will be reproduced on the output 59 corresponding to the pulses produced by the transducing head 33 properly representing binary ones.

However, when a spurious pulse is produced, caused by the transducing head 33 overlapping a flux transition zone in the preceding increment, such as the pulse in the second increment in the curve 43 of FIG. 2, this spurious pulse will be blocked by one of the AND gates 49 or 53 and will not pass through to the output 59. For example, if the flux transition zone in the preceding increment representing a one were such as to produce a positive output pulse, then the positive output pulse that would have been produced by this flux transition zone during the preceding increment would have passed through the gate 49 and through the OR gate 57 to the peak detector 55, which thereupon would have set the flipflop 61 in its zero state.

The spurious pulse which would be produced in the succeeding increment would also have a positive pulse and, accordingly, would be applied to the gate 49. But because the flipflop 61 has been switched to its zero state, the gate 49 would no longer be enabled, and, as a result, the spurious pulse would be blocked and no pulse would be produced at output 59.

Similarly, if the flux transition zone overlapped by the transducing head 33 were such as to cause a negative pulse, then when the spurious pulse is produced in the succeeding increment, the flipflop 61 would have been switched to its one state so that the spurious pulse would be blocked by the gate 53. In this manner, the spurious pulses are eliminated from the output 59 and only pulses properly representing binary ones are produced at the output 59.

Means are provided to preset the flipflop 61 prior to a read out operation so that it will be in the proper state to enable the correct one of the gates 49 and 53 when the first output pulse representing a one is read out. This means, for example, could be a signal to set the flipflop 61 in its one state, if the information is recorded so that the first output pulses representing a one will always be a positive pulse.

The above description is of a preferred embodiment of the invention and many modifications may be made thereto without departing from the spirit and scope of the invention, which is defined in the appended claims.

What is claimed is:

1. An incremental tape transport comprising:
- a magnetic storage tape,
- a transducing head positioned to read out from said tape,
- means to drive said tape past said transducing head in incremental steps,
- a first electronic gate,
- a second electronic gate,
- bistable means having first and second stable states and operable to enable said first gate when in said first stable state and operable to enable said second gate when in said second stable state,
- circuit means responsive to the output of said transducing head to apply a pulse to said first gate only when said transducing head produces a positive pulse and to apply a pulse to said second gate only when said transducing head produces a negative pulse, and
- means to switch said bistable means to the opposite state each time a pulse passes either through said first gate or said second gate.

2. An incremental tape transport comprising:
- a magnetic storage tape,
- a transducing head positioned to read out from said tape,
- means to drive said tape past said transducing head in incremental steps, and
- means connected to said transducing head to pass each pulse produced by said transducing head only if such pulse has the opposite polarity from the preceding pulse produced by said transducing head.

3. An incremental tape transport comprising:
- a magnetic storage tape,
- a transducing head positioned to read out from said tape,
- means to drive said tape past said transducing head in incremental steps,
- a first channel connected to said transducing head,
- a second channel connected to said transducing head,
- a first electronic gate in said first channel,
- a second electronic gate in said second channel,
- a first rectifier in said first channel to pass through said first channel only pulses which were positive at the time they were produced by said transducing head,
- a second rectifier in said second channel to pass through said second channel only pulses which were negative at the time they were produced by said transducing head,
- bistable means having first and second stable states and operable to enable said first gate only when in said first stable state and operable to enable said second gate only when in said second stable state, and
- means responsive to a pulse passing through either said first channel or said second channel to switch said bistable means to the opposite state.

4. An incremental tape transport as recited in claim 3 wherein an inverter is included in said second channel to change the negative pulses in said second channel to positive pulses.

5. An incremental tape transport comprising:
- a magnetic storage tape,
- a transducing head positioned to read out from said tape,
- means to drive said tape past said transducing head in incremental steps,
- a first electronic gate,
- a second electronic gate,
- means to apply the positive pulses produced by said transducing head to said first gate,
- means to invert the negative pulses produced by said transducing head and apply the inverted pulses to said second gate,
- a bistable means having a first stable state and a second stable state and operable when in said first stable state to enable said first gate and operable when in said second stable state to enable said second gate, and
- means responsive to a pulse passing either through said first gate or said second gate to switch said bistable means to the opposite state.

6. A method of eliminating errors in the read out of binary signals in an incremental tape transport comprising the steps of:
- recording the binary signals on the magnetic tape by reversing the flux to represent one binary signal and maintaining the flux the same to represent the opposite binary signal,
- advancing the tape incrementally to read out the recorded signals, and
- passing each pulse read out only if it has the opposite polarity from the preceding pulse.

7. An incremental magnetic storage device comprising:
- a magnetic storage medium,
- a transducer disposed to read out signals from said medium,
- means to drive said medium past said transducer in incremental steps,
- a first signal translating channel having an enabled state and disenabled state,
- a second signal translating channel having an enabled state and disenabled state,
- means for coupling said first and second signal translating channels to said transducer, and
- means responsive to an output from said first and second signal translating channels to alternatively enable said first and second channels.

8. An incremental magnetic storage device as in claim 7 wherein said first signal translating channel in its enabled state passes only signals read from said medium having a first level and said second signal translating channel in its enabled state passes only signals read from said medium having a second level.

9. An incremental magnetic storage device as in claim 7 wherein said first signal translating channel in its enabled state is responsive only to signals read from said medium of one polarity and said second signal translating channel in its enabled state is responsive only to signals read from said medium of the opposite polarity.

References Cited

UNITED STATES PATENTS 3,243,580 3/1966 Welsh ------------ 235—61.11

DARYL W. COOK, Primary Examiner

U.S. Cl. X.R.

340—146.1, 174.1